April 18, 1967 M. J. WRIGHT 3,315,091

MONOSTABLE CIRCUITS

Filed Dec. 16, 1963

United States Patent Office 3,315,091
Patented Apr. 18, 1967

3,315,091
MONOSTABLE CIRCUITS

Maurice James Wright, Harborne, Birmingham, England, assignor to Joseph Lucas (Industries) Limited, Birmingham, England Filed Dec. 16, 1963, Ser. No. 330,795
Claims priority, application Great Britain, Dec. 21, 1962, 48,290/62
4 Claims. (Cl. 307—88.5)

In my application No. 222,386, now abandoned, there is described and claimed a monostable circuit comprising in combination first and second terminals for connection to a D.C. source so as to be of relatively positive and negative polarity respectively, a switchable rectifier having its anode and cathode connected to the first and second terminals respectively, a load in the anode-cathode circuit of the switchable rectifier, and a capacitor and a four layer diode connected in a series circuit between the gate of the switchable rectifier and one of said terminals, the arrangement being such that when a triggering pulse is applied to the gate of the switchable rectifier to render it conductive, the capacitor will be charged until the voltage across it reaches a value at which the four-layer diode breaks down, whereafter discharge of the capacitor through the four-layer liode will serve to switch off the switchable rectifier.

The term "switchable rectifier" refers to a semiconductor controlled rectifier having the additional property that it can be switched off by a negative pulse at its gate.

The present invention relates to a modification of the invention described in my application No. 222,386, now abandoned.

According to the present invention, in a monostable circuit as claimed in claim 1 of my application No. 222,386 the load is in the cathode circuit of the switchable rectifier and the series circuit containing the four-layer diode and capacitor is connected between the gate of the switchable rectifier and the cathode of the switchable rectifier, a point intermediate the four-layer diode and the capacitor being connected to the second terminal through a circuit including a resistor.

Figure 1:
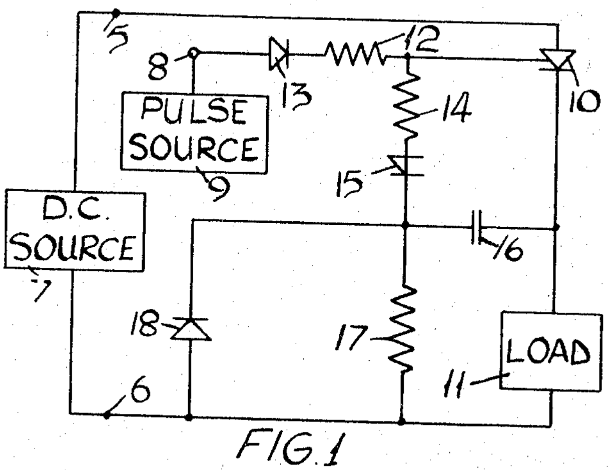
Figure 2:
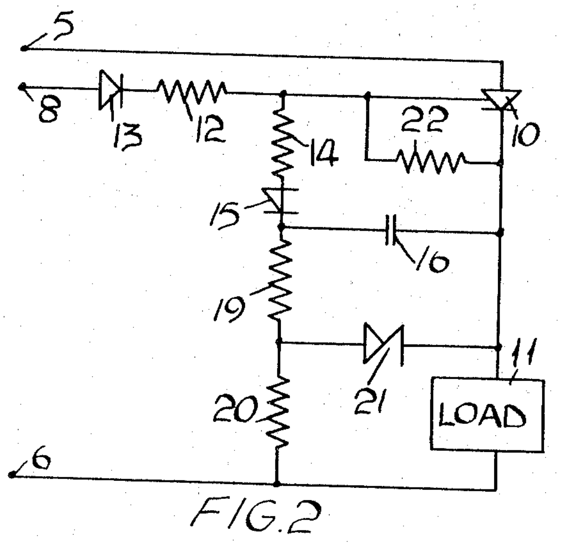

In the accompanying drawings, FIGURES 1 and 2 respectively are circuit diagrams illustrating two examples of the invention.

Referring to FIGURE 1, there are provided first and second terminals 5, 6 which in use are connected to a D.C. source 7 so as to be of positive and negative polarity respectively, and a third terminal 8 which in use is connected to a source 9 of positive triggering pulses. The terminal 5 is connected to the anode of a switchable rectifier 10 having its cathode connected to the terminal 6 through a load 11, and its gate connected to the terminal 8 through a resistor 12 in series with the cathode and anode of a diode 13. The gate of the switchable rectifier is further connected to its cathode through a series circuit containing a resistor 14, a four-layer diode 15 and a capacitor 16. Moreover, a point intermediate the four-layer diode 15 and capacitor 16 is connected to the terminal 6 through a resistor 17, in parallel with the cathode and anode of a diode 18.

The arrangement is such that when the switchable rectifier is switched on by a triggering pulse, current flows through the load 11 and the capacitor 16 is charged, through the resistor 17 by the voltage across the load. When the voltage across the capacitor 16 reaches a value sufficient to break down the four layer diode 15, the capacitor discharges through the four-layer diode 15, the resistor 14 and the gate and cathode of the switchable rectifier 10, which is thus switched off. At this point the potential at the cathode of the switchable rectifier 10 falls to that of the negative terminal 6 and so the left hand plate of the capacitor 16 becomes more negative than the terminal 6. The diode 18 thus ensures that the capacitor 16 is completely discharged.

In the modification shown in FIGURE 2, the resistor 17 is replaced by a pair of resistors 19, 20 in series, and a point intermediate the resistors 19, 20 is connected to the cathode of the switchable rectifier through the anode and cathode of a Zener diode 21. The operation is similar to the first example except that the Zener diode 21 stabilises the charging rate of the capacitor, so that the pulse duration is not dependent on the voltage across the terminals 5, 6. In this example a resistor 22 is connected between the gate and cathode of the switchable rectifier 10 to provide a discharge path for the capacitor when the rectifier 10 is switched off. The resistor 22 may be used in place of, or in addition to, the diode 18.

Having thus described my invention what I claim as new and desire to secure by Letters Patent is:

1. A monostable circuit comprising first and second terminals for connection to a source of direct current so as to be of relatively positive and negative polarity respectively, a third terminal for connection to a source of positive triggering pulses, a switchable rectifier having an anode, a cathode and a gate, said switchable rectifier being turned on by positive current flow between its gate and cathode, and being turned off by negative current flow between its gate and cathode, means connecting the anode and gate of said switchable rectifier to the first and third terminals respectively, a load through which the cathode of said switchable rectifier is connected to the second terminal, a capacitor having a pair of plates, means connecting one of said capacitor plates to the cathode of said switchable rectifier, a circuit connecting the other plate of said capacitor to the gate of said switchable rectifier and including a four-layer diode poled to break down when said other plate of said capacitor attains a predetermined negative voltage with respect to said one plate connected to said cathode of said switchable rectifier, and a circuit connecting said other plate of said capacitor to said second terminal and including a resistor, said switchable rectifier being turned on by pulses applied to the third terminal, said capacitor being charged when said switchable rectifier conducts until said four-layer diode breaks down, and said capacitor discharging when said four-layer diode breaks down to turn said switchable rectifier off.

2. A circuit as claimed in claim 1 in which said circuit connecting said other plate on said capacitor to said second terminal includes a pair of resistors, the circuit further including a Zener diode having its anode connected to a point intermediate said pair of resistors, and its cathode connected to the cathode of said switchable rectifier.

3. A circuit as claimed in claim 1 including a diode having its anode connected to the second terminal and its cathode connected to said other plate of said capacitor.

4. A circuit as claimed in claim 1 including a resistor interconnecting the gate and cathode of said switchable rectifier.

References Cited by the Examiner

UNITED STATES PATENTS

| | | | |
|---|---|---|---|
| 2,404,001 | 7/1946 | Smith | 328—67 |
| 3,191,112 | 6/1965 | Cain | 307—88.5 |

JOHN W. HUCKERT, *Primary Examiner.*

D. O. KRAFT, *Assistant Examiner.*